June 8, 1954          G. V. NOLDE          2,680,808

CAPACITOR CHARGING AND DISCHARGING CIRCUIT

Filed July 20, 1950

INVENTOR
George V. Nolde
BY
Howard M. Dustin.

Patented June 8, 1954

2,680,808

UNITED STATES PATENT OFFICE 2,680,808

CAPACITOR CHARGING AND DISCHARGING CIRCUIT

George V. Nolde, Berkeley, Calif., assignor to Marchant Calculators, Inc., a corporation of California Application July 20, 1950, Serial No. 174,867

15 Claims. (Cl. 250—27)

This invention relates to capacitor regenerators and more specifically to means for utilizing a positive informational charge on an electrical capacitor to cause regeneration of a charge of selected magnitude on the same capacitor.

It is frequently desirable to use electrical capacitors as a means for storing positive charges which are indicative of numerical or other information. The inherent leakage characteristics of capacitors, however, cause the charges so stored to gradually decay and to thereby lose their informational value.

The principal object of the present invention therefore, is to employ any significant residue of a partially decayed single-step positive informational charge on a capacitor for causing restoration of the full informational charge on that capacitor.

Another object of the invention is to employ the residue of a partially decayed multiple-step positive informational charge on a capacitor for causing restoration of the charge on that capacitor to the potential level from which it decayed.

Another, and more specific object of the invention is to impress a positive charge, stored on a capacitor, upon a grid-like control electrode of a gas-filled electronic discharge device to fire that device, thereby varying the cathode potential of such device to cause a like variation of the potential of the control electrode for recharging the capacitor to a predetermined potential level.

Another more specific object of the invention is to impress a positive stepped charge, stored on a capacitor, upon a respective control electrode of each of a plurality of gas tubes to fire a number of such tubes determined by the number of steps of the charge, thereby varying the respective cathode potential of each conducting tube to a given value to likewise vary the potential of the respective control electrode of each conducting tube to a unique value, recharging the capacitor to a selected potential level which is determined by the highest control electrode potential of any tube.

A further object of the invention is to charge a capacitor to the potential of a control electrode of a conducting gas-filled electronic discharge device, and to control the potential of the control electrode by varying the cathode potential of such electronic discharge device.

Another object of the present invention is to perform such capacitor regeneration simply and economically.

A further object of the invention is to entirely eliminate interaction between such capacitor regeneration circuit and any other circuit employing such capacitor.

Another object of the invention is to selectively control the potential level to which such capacitor is recharged, by varying the respective values of the plate and/or cathode resistances of a gas tube.

Another object of the invention is to selectively control the lowest potential level to which a charge on such capacitor may decay and still be sufficient to cause such regenerative action.

Other objects of the invention will appear from the following description, with reference to the drawings in which.

In the following description and appended claims, the term "control electrode" will be used to denote a grid or similar element within an electronic device and not fed by any external source of generated potential.

It has been found that while a gas-filled tube is firing, such a control electrode assumes a potential, the value of which equals the potential at that position within the ionized gas of the tube where the control electrode is located. It has also been found that varying the cathode potential in such a tube causes a similar variation in the control electrode potential. By connecting such an electrode to an external capacitor, the controlled potential of that electrode may be employed to charge the capacitor to a selected level.

The present invention is therefore based upon the principle of controlling the potential of a "floating" tube element in a conducting gas-filled discharge device by controlling the cathode potential of that device, and employing the controlled potential on such element to apply a selected voltage to a capacitor or other information storing device.

Single-step regeneration

Figure 1:
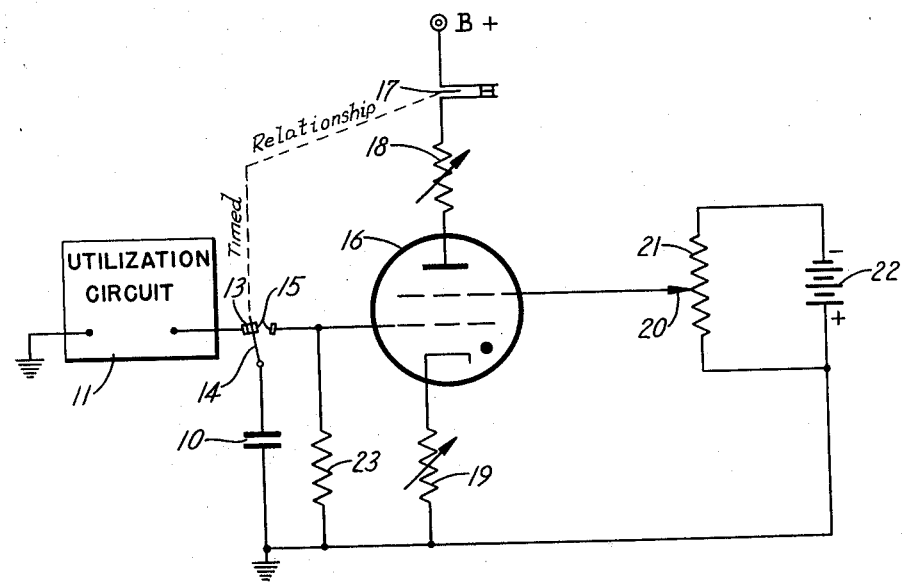
Fig. 1 is a wiring diagram of the single-step capacitor regeneration circuit.

The above principle is employed in the regeneration of a single-step charge of predetermined magnitude on a capacitor 10 (Fig. 1). This capacitor is primarily used as a circuit element for storing an informational charge in a utilization circuit 11. During such storage, the capacitor is connected to circuit 11 by a pair of closed contacts 13, as shown in Fig. 1. If the charge so stored on capacitor 10 has substantially decayed before it is to be used, its regeneration to standard value is initiated by throwing a switch 14 to the right to close a pair of contacts 15 and connect the capacitor to a control electrode of a gas tube 16.

Tube 16 receives its anode potential from a terminal B+ of a source of positive potential, through a switch 17 and a variable impedance, shown as resistor 18. The cathode of tube 16 is connected to ground through a variable impedance, shown as a resistor 19. A bias grid in tube 16 receives a variable bias from a tap 20 on a potentiometer 21 which is connected between the positive and negative terminals of a source 22 of potential, shown as a battery. The positive terminal of source 22 is grounded so that the bias grid receives a negative bias.

The anode potential and bias grid potential of tube 16 are so chosen that the tube is normally non-conducting but fires when a slight positive voltage is impressed upon its control electrode from capacitor 10 by closing the above mentioned contacts 15. Therefore, even though a substantial portion of a charge stored on capacitor 10 by the circuit 11 has been dissipated by leakage, etc., the present circuit is so arranged that the remainder of such a charge is sufficient to fire tube 16 and thereby initiate the regeneration action.

The minimum level of residual charge which will fire tube 16 may be selectively controlled by varying the potential on the bias grid, thereby varying the control electrode potential necessary for firing the tube. It will appear that tube 16 may be biased by a number of conventional means other than a bias grid, to attain the desired threshold of conduction. For example, if a three electrode tube were used, it could be biased by tapping the cathode to an independent voltage divider.

If at least the above minimum charge resides on capacitor 10 when contacts 15 are closed, tube 16 fires and current flows from terminal B+ through switch 17, anode resistor 18, tube 16 and cathode resistor 19 to ground. The potential drop across resistor 19 due to this current causes the cathode potential to rise above ground level. The control electrode potential rises with the cathode potential, as explained above, and recharges capacitor 10 to a value which is determined by the cathode potential. The potential to which the cathode and consequently the control electrode rises when tube 16 is fired may be selectively varied by varying the relative values of the anode and cathode resistors, both of which are shown as variable resistors in order to increase the range of the possible ratios of their respective resistances.

When capacitor 10 has become recharged, switch 14 is thrown to the left to open contacts 15 and close contacts 13, disconnecting capacitor 10 from the regeneration circuit and reconnecting it to the utilization circuit 11. Subsequently, tube 16 is extinguished by temporarily opening its anode circuit at switch 17. Switch 17 may be cyclically operated in timed relation to switch 14 so that contacts 15 are invariably opened before switch 17 is opened, thus preventing the charged capacitor from refiring tube 16.

A grid leak resistor 23 may be connected between ground and the control electrode of tube 16 for bleeding any contact potential from the control electrode and for stabilizing the potential of that electrode.

*Multiple-step regeneration*

It is often desirable to store a selected one of several predetermined levels of voltage on a capacitor in some utilization circuit and later to use the stored voltage in some manner in that circuit. In order that such potential levels may be separated by discrete steps and therefore be useful, each as a fixed value of potential, it is necessary that whichever step of charge is stored on the capacitor be regenerated to the full value of that step before it is otherwise employed. The regeneration principle of the present invention may be employed for such multiple-step regeneration as well as for the single-step regeneration described above.

Figure 2:
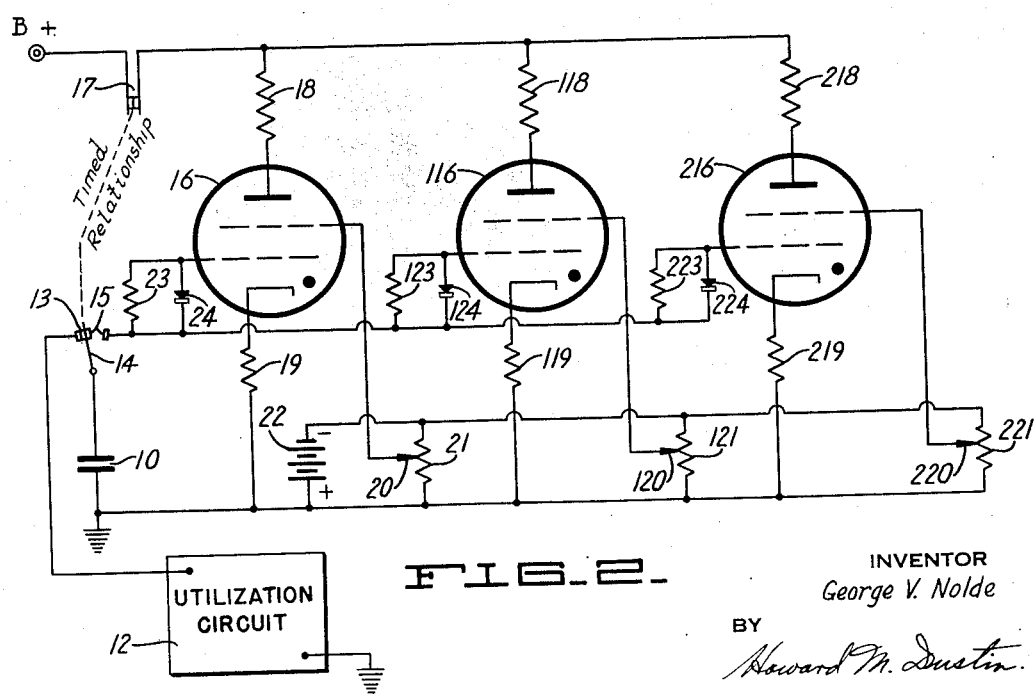
Fig. 2 is a wiring diagram of the multiple-step capacitor regeneration circuit.

Fig. 2 illustrates a multiple-step regeneration circuit. Corresponding parts in Figs. 1 and 2 are identified by the same reference numerals.

Capacitor 10 is charged to a selected one of a number of potential levels by utilization circuit 12 through a switch 14, described hereinbefore. The capacitor is connected to the regeneration circuit by throwing switch 14 to the right, thereby closing contacts 15 and connecting capacitor 10, in parallel, to the control electrode of each of a number of gas-filled tubes corresponding to the number of voltage steps that may be stored on the capacitor.

The contemplated use of this regenerator is with a nine-step storage circuit of a decimal numeral system. It will appear, however, that the regenerator may be applied equally well to other numeral systems, such as the octal system (seven-step storage) and to non-numeral systems such as a system of selected items A, B, C, etc. For simplicity of illustration, only three tubes, and therefore a three-step storage and regeneration circuit are herein shown and described.

The connection between each control electrode and switch 14 includes a respective rectifier 24, 124 or 224, in parallel with a respective control electrode resistor 25, 125 or 225. Each tube receives its anode potential from a common positive terminal B+ of a source of potential, through a common switch 17 and a respective anode resistor 18, 118 or 218. The cathode of each tube is connected to ground through a respective cathode resistor 19, 119 or 219. A bias grid in each tube receives bias potential through a respective tube receives bias potential through a respective potentiometer tap 20, 120 or 220 on a respective potentiometer 21, 121 or 221. Potentiometers 21, 121 and 221 are connected in parallel between the positive and negative terminals of a source 22 of potential, shown as a battery. The positive terminal of source 22 is connected to ground so that each bias grid receives a selected negative potential.

The bias grid potential of each tube is so chosen, by varying the tap point on its associated potentiometer, that the control electrode firing potential of each tube is unique with respect to the firing potential of each other tube. Tube 16 is biased to fire when the capacitor impresses upon its control electrode a voltage of a value between the level of the lowest potential step and a level slightly above ground potential. Likewise, tube 116 is biased to fire when its control electrode assumes any potential between the second potential step and a level slightly above the first step; and tube 216 fires when its control electrode assumes any potential between the third potential step and a level slightly higher than the second step. It will be noted that overlapping of action is prevented by providing a margin between each full potential step and the least potential which will fire the tube corresponding to the next higher step. Thus, if two steps of charge have been stored on capacitor 10 by circuit 12, tubes 16 and 116 fire when contacts 15 are closed, even though a part of the charge on the capacitor has decayed, provided that charge has not decayed below the control electrode firing level of tube 116. Tube 216 does not fire because the potential so impressed upon its control electrode is insufficient to cause firing.

As each tube fires, its cathode potential and control electrode potentials rise as explained hereinbefore, charging capacitor 10 through the associated rectifier 24, 124 or 224. The anode resistor and cathode resistor of each tube are so chosen that the control electrode potential of tube 16 rises to the lowest potential step when that tube fires, and the control electrode potentials of tubes 116 and 216 rise to the second and third potential steps, respectively, when they fire. Thus, if only tube 16 is fired by the capacitor, the capacitor is regenerated to the lowest step of potential; if tubes 16 and 116 are fired, the capacitor is regenerated to the second voltage step; and if all three tubes are fired, the capacitor is regenerated to the third step.

Rectifiers 24, 124 and 224 pass current from their respective control electrodes to capacitor 10 but block current from one control electrode to another. The resistors 23, 123 and 223, being of high value, block any substantial current but pass the voltage from capacitor 10 to the control electrodes for firing the tubes.

After one or more tubes have fired, regenerating the voltage on capacitor 10 to its proper level, switch 14 is thrown to the left to disconnect the capacitor from the regeneration circuit and reconnect it to the utilization circuit 12. Subsequently, switch 17 is opened, breaking the anode circuits of all the tubes and extinguishing any tubes which are conducting. Switches 17 and 14 may be cyclically operable by any conventional means. It is to be understood that although switch 14 is shown in Figs. 1 and 2 as a simple double-throw switch it may, without departing from the spirit of the invention, be a more complex switching device, such as a commutator, adapted to serially connect a plurality of capacitors, such as 10, with the single regeneration circuit.

I claim:

1. The combination of a gas-filled electron discharge tube having at least a cathode, an anode and a control electrode, a capacitor, means for storing a charge on said capacitor, a coupling between said capacitor and said control electrode to impress said charge upon said electrode to thereby cause the tube to conduct, means responsive to conduction of said tube for raising the potential of said control electrode, and means including said coupling constituting the sole means for causing the control electrode potential to regenerate a charge on said capacitor.

2. The combination of a gas-filled electron discharge tube having at least a cathode, an anode and a control electrode, a capacitor, means for storing a charge on said capacitor, a coupling between said capacitor and said control electrode to impress said charge upon said electrode to thereby cause the tube to conduct, tube biasing means for determining the minimum charge on said capacitor which will cause the tube to conduct, means responsive to conduction of said tube for raising the potential of said control electrode, and means including said coupling constituting the sole means for causing the control electrode potential to regenerate a charge on said capacitor.

3. The combination of a normally non-conducting gas-filled electron tube having at least a cathode, an anode, a bias grid and a control electrode, a discharge circuit for said tube including a source of anode potential, a storage capacitor, means including a normally open first switch connected between said control electrode and said capacitor and rendered effective by closure of said switch to cause said tube to conduct if at least a minimum positive charge is stored on said capacitor at the time said switch is closed, a grid circuit including said bias grid and a source of variable grid potential for selectively determining the minimum charge on said capacitor which will cause the control electrode to fire the tube, means including a variable cathode resistor and a variable anode resistor to selectively control the level to which the cathode potential is raised in response to tube conduction, means for causing the control electrode potential to rise to a selected level in response to said rise in cathode potential, means including said first switch constituting the sole means to cause regeneration of a selected charge on said capacitor in response to said rise in the control electrode potential and operable subsequent to said regeneration to disconnect the capacitor from the control electrode, and a normally closed second switch connected between the anode and the source of anode potential and operable in timed relation to the operation of said first switch for opening the anode circuit to thereby extinguish the tube subsequent to said disconnection of the capacitor and control electrode by said first switch.

4. The combination of a gas-filled electron tube having at least a cathode and an anode, a discharge circuit for said tube including a source of positive anode potential to cause said gas to ionize and said tube to conduct, means including a cathode resistor and an anode resistor each adjustable to establish a selected resistance value and operative in response to tube conduction to cause the cathode potential to rise to a selected level determined by the adjustment of said resistors, a control electrode in said tube, means responsive to said rise in cathode potential for raising the potential of said control electrode to a selected level, a storage capacitor, a connection between the capacitor and said control electrode constituting the sole means for causing the capacitor to be charged to substantially the potential of said electrode, a utilization circuit, a switch for disconnecting the capacitor from said control electrode and connecting the same to the utilization circuit, and means operable in timed relation with the operation of said switch to extinguish the tube subsequent to said disconnection of the capacitor from the control electrode by said switch.

5. The combination of a normally non-conductive gas-filled electron tube having at least a cathode, an anode, a bias grid and a control electrode, a discharge circuit for said tube including a source of positive anode potential, a storage capacitor, a utilization circuit normally connected to the capacitor for storing a positive charge on the capacitor, a switch for disconnecting the capacitor from the utilization circuit and connecting the same to said control electrode to cause said charge on the capacitor to fire said tube, a source of variable bias potential connected to said bais grid for selectively determining the least charge on said capacitor which will fire said tube, means including a cathode resistor and operative in response to the conduction in said tube to cause the cathode potential to rise, means responsive to said rise in cathode potential for causing said control electrode potential to rise, means including said switch constituting the sole means to regenerate the charge on said capacitor in response to said rise in control electrode potential, and means for extinguishing said tube.

6. The combination of a gas-filled electron tube having at least a cathode and an anode, a discharge circuit for said tube including a source of positive anode potential whereby said gas is ionized and said device is caused to conduct, means including a cathode resistor and responsive to tube conduction to cause the cathode potential to rise and establish a range of potentials throughout said ionized gas, a control electrode in said tube responsive to said rise of cathode potential to assume the potential of the ionized gas proximate the position of said control electrode within said gas, a capacitor, means including a connection between said capacitor and said control electrodes constituting the sole means for causing the capacitor to be charged to substantially the potential of said electrode, a utilization circuit, a first switch for disconnecting the capacitor from the control electrode and connecting the same to the utilization circuit, and a normally closed second switch in the anode circuit of said tube and operable in timed relation to the operation of said first switch to open the anode circuit and extinguish the tube subsequent to said disconnection of the capacitor from the control electrode.

7. The combination of a normally non-conductive gas-filled electron discharge device having at least an anode, a cathode and a control electrode, a discharge circuit for said device including a source of positive anode potential, a storage capacitor, a utilization circuit normally connected to the capacitor for storing a positive charge on the capacitor, a first switch for disconnecting the capacitor from the utilization circuit and connecting the same to said control electrode for causing the charge on the capacitor to fire said device, means including a cathode resistor and operative in response to the conduction of said device to cause the cathode potential to rise, means responsive to said rise in cathode potential for causing the control electrode potential to rise, means including said first switch constituting the sole means for regenerating the charge on the capacitor in response to said rise in control electrod potential, means including said first switch for disconnecting the capacitor from said control electrode and reconnecting the same to the utilization circuit, a normally closed second switch in the anode circuit of said device and operable in timed relation with said operation of said first switch for opening the anode circuit to extinguish said device subsequent to said disconnection of the capacitor from the control electrode.

8. The combination of a normally non-conductive gas-filled electron tube having at least a cathode, an anode, a bias grid and a control electrode, a discharge circuit for said tube including a source of positive anode potential, a storage capacitor, a utilization circuit normally connected to the capacitor for storing a positive charge on the capacitor, a first switch for disconnecting the capacitor from said utilization circuit and connecting the same to said control electrode for causing the charge on the capacitor to fire the tube, a source of variable bias potential connected to said bias grid for selectively determining the least charge on the capacitor which will fire the tube, means including a cathode resistor and responsive to tube conduction to cause the cathode potential to rise, means responsive to said rise in cathode potential for causing the control electrode potential to rise, means including said first switch constituting the sole means for regenerating the charge on said capacitor in response to said rise in control electrode potential, means including said first switch for disconnecting the capacitor from said control electrode and reconnecting the same to the utilization circuit, and a normally closed second switch connected between said anode and said source of anode potential and operative in timed relation with said operation of said first switch to open the anode circuit of said tube for extinguishing the tube subsequent to said disconnection of the capacitor from the control electrode.

9. The combination of a plurality of normally non-conducting gas-filled electron discharge tubes each having at least an anode and a cathode, a discharge circuit for each tube including a source of anode potential, means for causing a selected number of said tubes to conduct, means including a respective cathode resistor for each tube to cause the cathode potential of each conducting tube to rise to a predetermined level, a control electrode in each tube, means responsive to said rise in the cathode potential of each conducting tube for causing the control electrode potential of each respective conducting tube to rise to a unique level, and a respective rectifier connecting the control electrode of each tube to a single capacitor for enabling the control electrodes of the conducting tubes to charge the capacitor to substantially the highest potential level appearing on any of said electrodes.

10. The combination of a plurality of normally non-conducting gas-filled electron discharge tubes each having at least an anode and a cathode, a discharge circuit for each tube including a source of anode potential, means for causing a selected number of said tubes to conduct, means including a respective cathode resistor for each tube to cause the cathode potential of each conducting tube to rise to a predetermined level, a respective control electrode in each tube, means responsive to said rise in the cathode potential of each conducting tube for causing the control electrode potential of each respective conducting tube to rise to a unique level, a storage capacitor, a respective rectifier connecting the control electrode of each tube to said capacitor for enabling the control electrodes of the conducting tubes to charge the capacitor to substantially the highest potential level appearing on any of said electrodes, a first switch operable to disconnect the capacitor from all of said control electrodes, and a normally closed second switch connected between the source of anode potential and the anode of each tube and operable in timed relation with said operation of the first switch to open the anode circuits of all of said tubes thereby extinguishing any conducting tube or tubes subsequent to said disconnection of the capacitor from the control electrodes.

11. The combination of a plurality of normally non-conducting gas-filled electron discharge tubes each having at least a cathode, an anode, a bias grid and a control electrode; a discharge circuit for each tube including a source of anode potential; a respective control electrode resistor connecting the control electrode of each tube to a single capacitor; means for charging said capacitor to a selected one of a number of stepped positive potentials corresponding to the number of said tubes; means including said respective electrode resistors for causing said stepped charge to fire one or more of said tubes; a bias grid circuit for each tube including a respective source of grid potential to bias each tube for conduction at a predetermined unique step of control electrode potential, whereby the number of tubes so fired corresponds to the number of steps of charge having been stored on said capacitor; means including a respective cathode resistor for each tube to cause the cathode potential of each conducting tube to rise to a predetermined level; means responsive to said rise in the cathode potential of each conducting tube for causing the respective control electrode potential of each respective conducting tube to rise to a unique value corresponding to an associated full step of capacitor charge; and a respective rectifier shunting each control electrode resistor for conducting current from each control electrode to the capacitor for regenerating the capacitor charge to that full step of charge corresponding to the highest potential appearing on the control electrode of any of said tubes.

12. The combination of a plurality of normally non-conducting gas-filled electron discharge tubes each having at least a cathode, an anode, a bias grid and a control electrode; a discharge circuit for each tube including a common source of anode potential; a storage capacitor; a respective control electrode resistor connecting the control electrode of each tube to said capacitor; means for charging said capacitor to a selected one of a number of stepped positive potentials corresponding to the number of said tubes; means including said control electrodes for enabling said stepped charge on the capacitor to fire one or more of said tubes; a respective bias grid circuit for each tube including a respective source of grid potential for biasing each tube to conduct at a predetermined unique step of control electrode potential, whereby the number of tubes so fired corresponds to the number of steps of charge having been stored on the capacitor; means including a respective cathode resistor for each tube to cause the cathode potential of each conducting tube to rise to a predetermined level; means responsive to said rise in the cathode potential of each conducting tube for causing the control electrode potential of each respective conducting tube to rise to a unique value corresponding to an associated full step of capacitor charge; a respective rectifier shunting each control electrode resistor for conducting current from each control electrode to said capacitor to regenerate that step of charge on said capacitor corresponding to the highest potential appearing on any control electrode; a first switch operable to disconnect the capacitor from said control electrode resistors; and a normally closed second switch connecting the anode of each tube to said source of anode potential and operable in timed relation with said operation of the first switch to open the anode circuits of all of said tubes, thereby extinguishing any conducting tube or tubes subsequent to said disconnection of the capacitor from the control electrode resistors.

13. The combination of a normally non-conducting gas-filled electron discharge tube having at least a cathode, an anode, and a control electrode, a discharge circuit for said tube, a storage capacitor, means including a normally opened first switch connected between the control electrode and the capacitor and rendered effective by closure of said switch to cause the tube to conduct if at least a minimum positive charge is stored on the capacitor at the time said switch is closed, means responsive to said conduction of the tube for raising the potential of said control electrode to a selected level, means including said first switch constituting the sole means for regenerating the charge on the capacitor to said selected potential level and operable subsequent to said regeneration to disconnect the capacitor from the control electrode, and a normally closed second switch in the anode circuit of said tube operable in timed relation to the operation of said first switch for opening the anode circuit to thereby extinguish the tube subsequent to said disconnection of the capacitor from the control electrode by said first switch.

14. The combination of a normally non-conducting gas-filled electron discharge tube having at least a cathode, an anode, and a control electrode, a discharge circuit for said tube including a source of anode potential, a storage capacitor, means including a normally opened switch connected between the control electrode and the capacitor and rendered effective by closure of said switch to cause the tube to conduct if at least a minimum positive charge is stored on the capacitor at the time said switch is closed, means including a cathode impedance to cause the cathode potential to rise in response to said conduction of the tube, means for causing the potential of said control electrode to rise to a selected level in response to said rise in the cathode potential, means including said switch constituting the sole means for regenerating the charge on the capacitor to said selected potential level and operable subsequent to said regeneration to disconnect the capacitor from the control electrode, and means operable in timed relation with the operation of said switch to extinguish the tube subsequent to said disconnection of the capacitor from the control electrode by said switch.

15. The combination of a normally non-conducting gas-filled electron discharge tube having at least a cathode, an anode, and a control electrode, a discharge circuit for said tube including a source of anode potential, a storage capacitor, means including a normally opened switch connected between the control electrode and the capacitor and rendered effective by closure of said switch to cause the tube to conduct if at least a minimum positive charge is stored on the capacitor at the time said switch is closed, means including a variable cathode resistor and a variable anode resistor to cause the cathode potential to rise in response to said conduction of the tube, means for causing the potential of said control electrode to rise to a selected level in response to the rise in the potential of said cathode, means including said switch constituting the sole means for regenerating the charge on the capacitor to said selected potential level and operable subsequent to said regeneration to disconnect the capacitor from the control electrode, and means operable in timed relation with the operation of said switch to extinguish the tube subsequent to said disconnection of the capacitor from the control electrode by said switch.

References Cited in the file of this patent

UNITED STATES PATENTS

| Number | Name | Date |
| --- | --- | --- |
| 2,070,900 | Harris | Feb. 16, 1937 |
| 2,113,011 | White | Apr. 5, 1938 |
| 2,140,350 | Dawson | Dec. 13, 1938 |
| 2,228,883 | Morgan | Jan. 14, 1941 |
| 2,282,182 | Gulliksen | May 5, 1942 |
| 2,366,197 | Klemperer | Jan. 2, 1945 |
| 2,415,943 | Fagen | Feb. 18, 1947 |
| 2,416,158 | Coykendall | Feb. 18, 1947 |